(12) United States Patent
Seong

(10) Patent No.: US 10,052,930 B2
(45) Date of Patent: Aug. 21, 2018

(54) STABILIZER FOR VEHICLE

(71) Applicant: MANDO CORPORATION, Pyeongtaek-si, Gyeonggi-do (KR)

(72) Inventor: Junho Seong, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 9 days.

(21) Appl. No.: 15/429,912

(22) Filed: Feb. 10, 2017

(65) Prior Publication Data
US 2017/0232812 A1   Aug. 17, 2017

(30) Foreign Application Priority Data

Feb. 12, 2016 (KR) .................. 10-2016-0016602

(51) Int. Cl.
*B60G 21/055* (2006.01)
*B60G 21/02* (2006.01)

(52) U.S. Cl.
CPC ....... *B60G 21/0555* (2013.01); *B60G 21/026* (2013.01); *B60G 2200/34* (2013.01); *B60G 2204/82* (2013.01); *B60G 2206/012* (2013.01); *B60G 2206/427* (2013.01); *B60G 2206/7102* (2013.01)

(58) Field of Classification Search
CPC .............. B60G 21/0555; B60G 21/026; B60G 2204/82; B60G 2206/427; B60G 2206/7102; B60G 2200/34; B60G 2206/012
See application file for complete search history.

(56) References Cited

U.S. PATENT DOCUMENTS

| 4,484,767 | A | * | 11/1984 | Klem | ................... | B60G 17/033 |
|---|---|---|---|---|---|---|
| | | | | | | 280/124.107 |
| 8,746,705 | B1 | * | 6/2014 | Kim | ...................... | B60G 7/001 |
| | | | | | | 280/124.149 |
| 2010/0164189 | A1 | * | 7/2010 | Buma | ................ | B60G 17/0161 |
| | | | | | | 280/5.521 |
| 2015/0014955 | A1 | * | 1/2015 | Leibl | ....................... | B60G 3/20 |
| | | | | | | 280/124.107 |
| 2016/0001620 | A1 | * | 1/2016 | Mohrlock | .............. | B60G 11/48 |
| | | | | | | 280/124.165 |

* cited by examiner

*Primary Examiner* — Drew J Brown
(74) *Attorney, Agent, or Firm* — McDermott Will & Emery LLP

(57) ABSTRACT

The present invention relates to a stabilizer for a vehicle which is installed between a pair of wheels of the vehicle and includes a first bar disposed to extend in a width direction of the vehicle; an actuator supported by a vehicle body of the vehicle and coupled to the first bar and a first connecting member to move the first bar in the width direction of the vehicle; and a second bar having one side connected to the first bar and the other side connected to one side of a wheel supporter which supports one wheel of the pair of wheels of the vehicle, wherein, when the first bar is moved in the width direction of the vehicle, the other side of the second bar is moved so that the one side of the wheel supporter is moved in an upper direction or a lower direction of the vehicle.

14 Claims, 7 Drawing Sheets

STABILIZER FOR VEHICLE

RELATED APPLICATIONS

The disclosure of Korean Patent Application No. 10-2016-0016602 filed Feb. 12, 2016 including the specification, drawings, and Abstract is incorporated herein by reference in its entirety.

TECHNICAL FIELD

The present invention relates to a stabilizer for a vehicle.

BACKGROUND ART

Generally, a stabilizer is often provided to improve stability of a vehicle body when a vehicle is turning or rolling.

The stabilizer is disposed between front wheels or between rear wheels of the vehicle. When the vehicle body of the vehicle tilts laterally, the stabilizer amplifies an output of a motor generated by an actuator using a speed reducer and rotates a stabilizer bar coupled to a rotation shaft of the actuator. The stabilizer bar rotated in this way can lift or lower the vehicle body by moving a drop link connected to the stabilizer bar up and down, thereby reducing an inclination of the vehicle body.

However, in a conventional stabilizer, a housing of an actuator of the stabilizer has difficulty in securing rigidity for withstanding torsional rigidity of stabilizer bars.

In addition, since only two mounting bearings are used to support the stabilizer in order to support the stabilizer bars disposed on both sides of the actuator in a width direction of a vehicle, efficiency of the stabilizer bars is reduced because a relatively heavy actuator is moved downward by a weight thereof, and thus the stabilizer bars are bent.

Technical Problem

The present invention is directed to providing a stabilizer for a vehicle capable of preventing a housing of an actuator of the stabilizer from moving downward.

The present invention is also directed to providing a stabilizer for a vehicle capable of moving in a vertical direction of wheel supporters that are connected to wheels so that stabilizer bars are not twisted and stability of a vehicle body is secured.

Technical Solution

One aspect of the present invention provides a stabilizer for a vehicle installed between a pair of wheels of the vehicle, the stabilizer including: a first bar disposed to extend in a width direction of the vehicle; an actuator supported by a vehicle body of the vehicle and coupled to the first bar and a first connecting member to move the first bar in the width direction of the vehicle; and a second bar having one side connected to the first bar and the other side connected to one side of a wheel supporter which supports one wheel of the pair of wheels of the vehicle, wherein, when the first bar is moved in the width direction of the vehicle, the other side of the second bar is moved so that the one side of the wheel supporter is moved in an upper direction or a lower direction of the vehicle.

The actuator may include a hollow motor, and the first bar may be coupled to the hollow motor to be movable through the hollow motor.

A central axis of the hollow motor may be disposed to be collinear with a rotating shaft of the wheel.

A pair of second bars, each of which is identical to the second bar, may be formed to be disposed at both ends of the first bar, the pair of second bars may be connected to the wheel supporters of the pair of wheels of the vehicle, and when one of the pair of second bars is moved in the upper direction, the other thereof may be moved in the lower direction.

Support members configured to support the first bar may be provided at both sides of the actuator of the vehicle body.

Guiders configured to guide movement in a vertical direction of the other side of the second bar may be formed at the vehicle body of the vehicle.

A third bar may be connected to the other side of the second bar by a second connecting member, and the third bar may be coupled to one side of the wheel supporter.

The first connecting member may include a ball joint or universal joint.

The wheel supporter may include at least one of an upper arm for supporting the wheel, a lower arm disposed under the upper arm, and a knuckle arm coupled between the upper arm and the lower arm.

The second bar may extend in a vertical direction thereof and may be disposed to be oblique in an outside direction of the vehicle from a lower side toward an upper side thereof.

A pair of first bars, each of which is identical to the first bar, a pair of actuators, each of which is identical to the actuator, and a pair of second bars, each of which is identical to the second bar, may be formed, and the pair of first bars, the pair of actuators, and the pair of second bars may be disposed to be laterally symmetrical in the width direction of the vehicle.

The pair of first bars, which are connected to the pair of actuators, may be operated so that one of the pair of second bars is moved in the upper direction and the other thereof is moved in the lower direction.

The pair of wheels of the vehicle may refer to one or both of front wheels and rear wheels of the vehicle.

A housing of the actuator may be formed of aluminum.

MODES OF THE INVENTION

Figure 1:
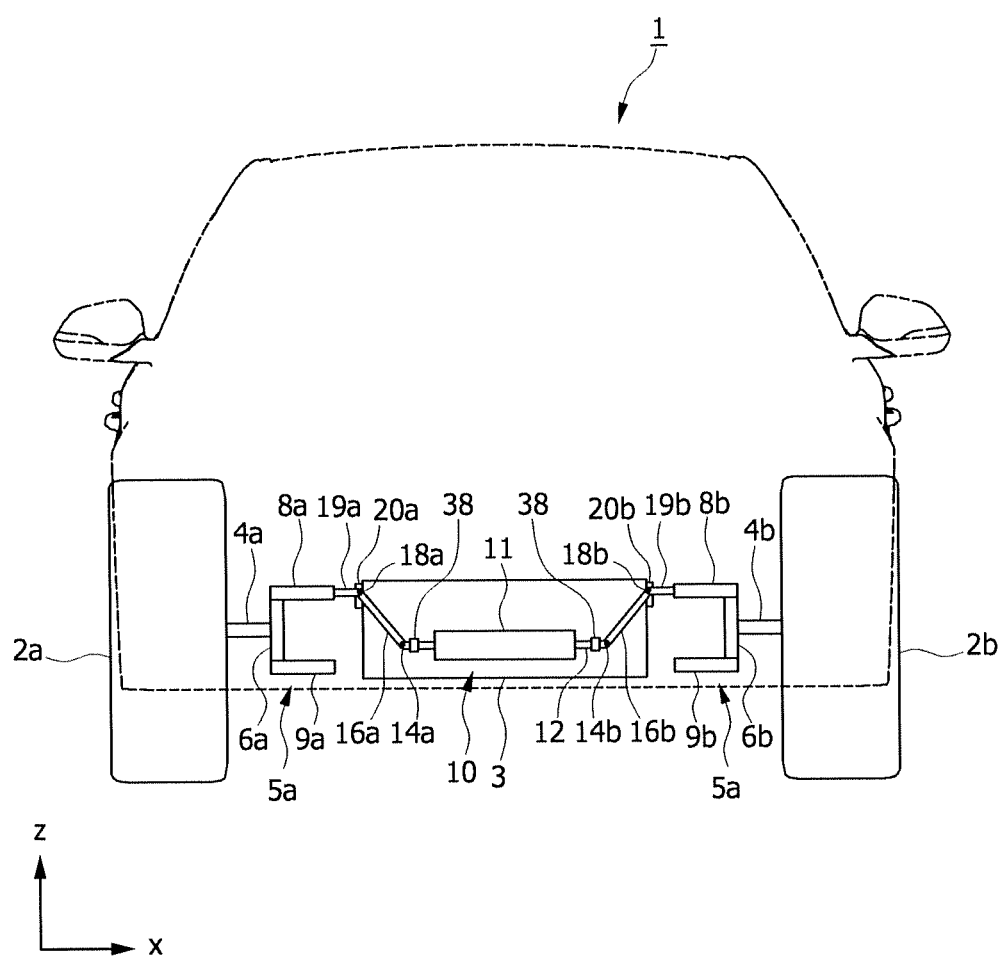
FIG. 1 is a front view illustrating a schematic configuration of a stabilizer for a vehicle according to a first embodiment of the present invention.

Hereinafter, exemplary embodiments of the present invention will be described in detail with reference to the accompanying drawings, which will be easily employed by those skilled in the art to which the present invention belongs. The present invention may be embodied in many different forms and is not limited to the embodiments described herein. In order to clearly describe the present invention, parts not related to descriptions of the present invention are omitted, and the same or similar components are assigned the same reference numerals throughout the specification.

Figure 2:
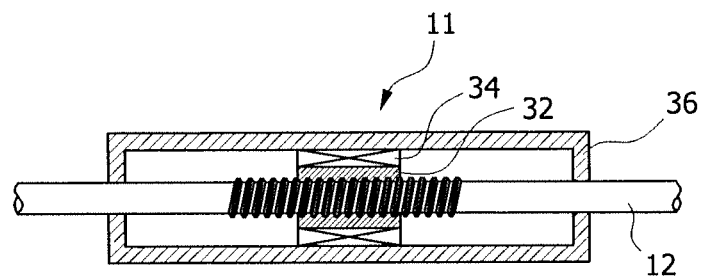
FIG. 2 is a cross-sectional view illustrating an actuator of the stabilizer for a vehicle according to the first embodiment of the present invention.
Figure 3:
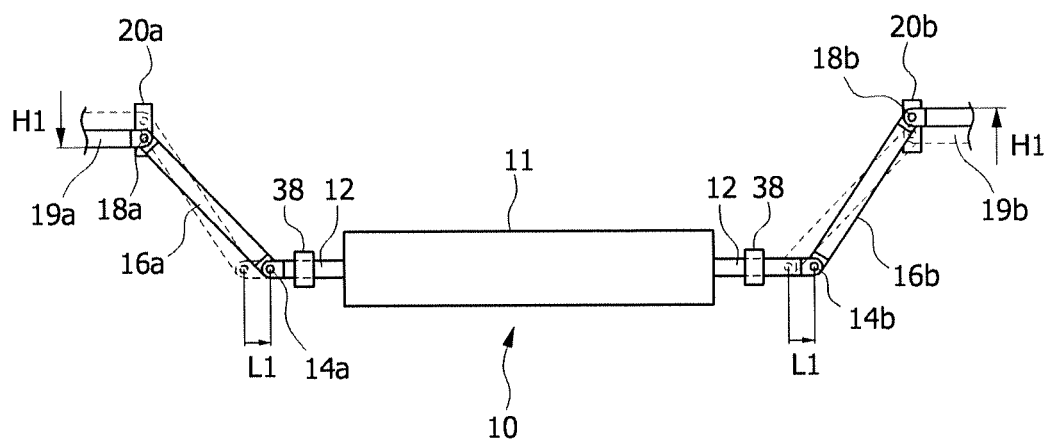
FIG. 3 is a view illustrating an operating state of the stabilizer for a vehicle according to the first embodiment of the present invention.
Figure 4:
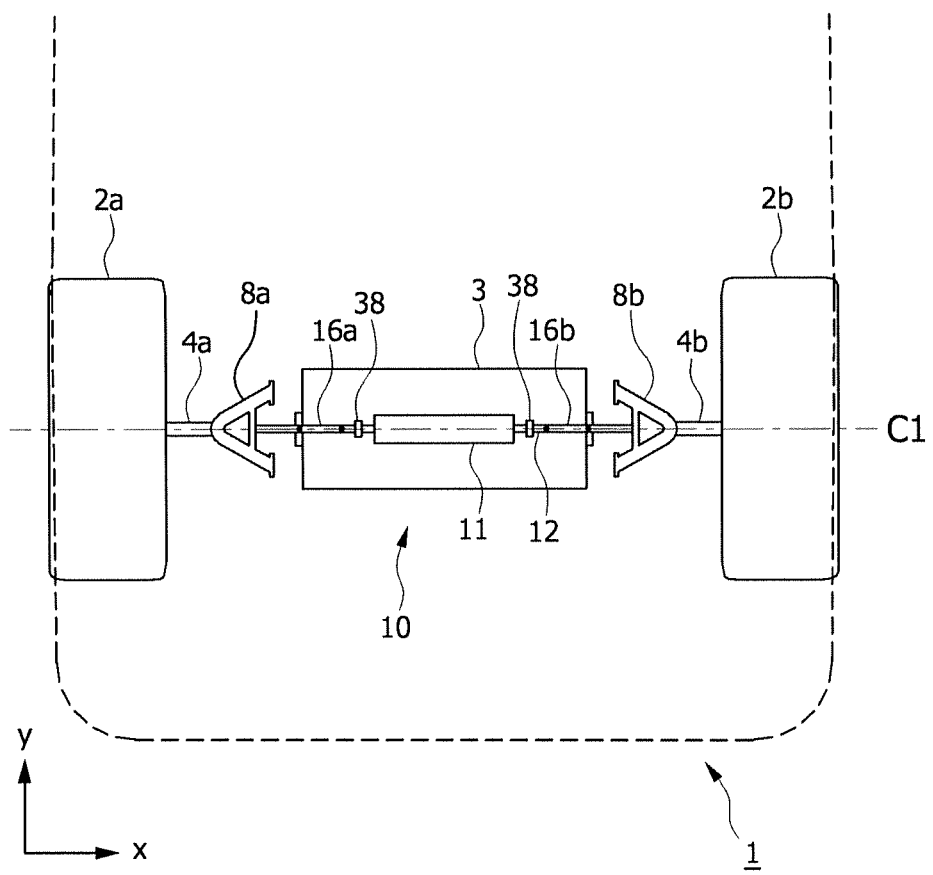
FIG. 4 is a plan view illustrating a schematic configuration of the stabilizer for a vehicle according to the first embodiment of the present invention.

FIG. 1 is a front view illustrating a schematic configuration of a stabilizer for a vehicle according to a first embodiment of the present invention. FIG. 2 is a cross-sectional view illustrating an actuator of the stabilizer for a vehicle according to the first embodiment of the present invention. FIG. 3 is a view illustrating an operating state of the stabilizer for a vehicle according to the first embodiment of the present invention. FIG. 4 is a plan view illustrating a schematic configuration of the stabilizer for a vehicle according to the first embodiment of the present invention. In FIG. 2, only a hollow motor, a cylindrical housing, and a cylindrical member are shown for the sake of simplicity of the drawing.

Referring to FIGS. 1 to 4, a stabilizer 10 for a vehicle according to the first embodiment of the present invention may include an actuator 11, a first bar 12, second bars 16a and 16b, guiders 20a and 20b, and third bars 19a and 19b.

The stabilizer 10 for a vehicle according to the first embodiment of the present invention is disposed between a pair of wheels 2a and 2b of a vehicle 1 and formed to control a posture of the vehicle or adjust an inclination of a vehicle body.

Here, the pair of wheels 2a and 2b of the vehicle, between which the stabilizer for a vehicle is installed, may refer to one or both of front wheels and rear wheels of the vehicle. When the vehicle is driven by front-wheel drive, rear-wheel drive, or four-wheel drive, the stabilizer for a vehicle may be disposed between driving wheels. In the embodiment, an example will be described on the basis of the stabilizer for a vehicle being installed between rear wheels of a vehicle.

The actuator 11 is located at a central portion in a width direction of the vehicle and is formed to be supported by a vehicle body 3. Here, the actuator is formed to move the first bar 12 coupled to the actuator 11 in the width direction of the vehicle.

The first bar 12 coupled to the actuator 11 may be formed to be a bar extending in the width direction of the vehicle. Here, the first bar 12 may be formed in a straight line shape having a circular shaped cross section, but may be formed in a shape of which a part extends in a bent shape according to an internal structure of the vehicle. In addition, the first bar 12 may be formed to be laterally symmetrical about the actuator 11.

Referring to FIG. 2, the actuator 11 according to the first embodiment of the present invention may include a hollow motor 34. Here, the hollow motor 34 may be formed in a cylindrical shape and disposed inside a cylindrical housing 36. Although not shown, well-known components, such as a speed reducer, bearings, etc., to be coupled to the hollow motor are provided inside the housing to drive the actuator.

According to one embodiment of the present invention, the cylindrical housing 36 is made of aluminum to be formed to be lightweight.

The cylindrical housing 36 of the actuator 11 may be coupled to the vehicle body 3 inside the vehicle and supported by the vehicle body 3.

As described above, since the cylindrical housing 36 of the actuator 11 is formed of aluminum and stably supported by the vehicle body 3 inside the vehicle, the first bar 12 operated by the actuator 11 can be prevented from being bent by the actuator 11 which is sagging due to a weight thereof.

The first bar 12 may be formed to extend to pass through the hollow motor 34 and be coupled to a toothed structure located inside the hollow motor 34 so that the first bar 12 is moved in the width direction of the vehicle according to an operation of the hollow motor 34, that is, in a left or right direction of a center of the vehicle.

For example, a screw thread is formed on a circumferential surface of the first bar 12, and a cylindrical member 32 formed to have a screw thread which corresponds and interlocks with the screw thread formed on the circumferential surface of the first bar 12 may be provided inside the hollow motor 34.

Here, the cylindrical member 32 may be formed to be rotatable while a location of the cylindrical member 32 is fixed, and when the cylindrical member 32 is rotated by actuator 11 being operated, the first bar 12 may be moved in a left or right direction of the width direction of the vehicle according to a rotational direction of the cylindrical member 32.

However, a moving structure of the first bar 12 coupled to the hollow motor 34 in the width direction of the vehicle is not limited to the above, and may be formed to have various well-known actuator structures in which the first bar 12 is movable in the width direction of the vehicle. For example, the actuator may be formed to be a structure including a linear motor or the like in which the first bar is moved in the width direction of the vehicle.

When compared with a conventional active roll stabilizer formed with a cylindrical actuator structure, the first bar 12 is formed to be moved by the hollow motor 34 in the first embodiment of the present invention because the stabilizer for a vehicle according to the first embodiment of the present invention may be formed to be spatially similar to a structure of the conventional active roll stabilizer. However, according to an internal structure of the vehicle, the stabilizer for a vehicle may be formed using another shape of actuator instead of a cylindrical shaped actuator.

Here, in order to stably support the first bar 12 while the first bar 12 is moving in the width direction of the vehicle, cylindrical support members 38, e.g., mounting bushings, may be provided at both sides of the actuator 11.

Meanwhile, according to one embodiment of the present invention, the pair of second bars 16a and 16b are connected to both ends of the first bar 12 by first connecting members 14a and 14b, respectively.

Here, one end of each of the second bars 16a and 16b is connected to the first bar 12, and the other end is formed to be coupled to one side of each of wheel supporters 5a and 5b which supports one wheel of the pair of wheels 2a and 2b of the vehicle.

Here, ball joints or universal joints may be used for the first connecting members 14a and 14b that connect the second bars 16a and 16b to both ends of the first bar 12. Accordingly, when the first bar 12 is rotated and moved in a lateral direction, the rotary motion of the first bar 12 is not transferred to the second bars 16a and 16b, and the second bars 16a and 16b are only moved by the movement of the first bar 12 in the lateral direction.

Referring to FIG. 1, the second bars 16a and 16b extend in a vertical direction and are disposed to be oblique in an outside direction of the vehicle from a lower side toward an upper side thereof.

Here, upper ends of the second bars 16a and 16b are located at guiders 20a and 20b formed at the vehicle body, and may be formed to move in the vertical direction with respect to the vehicle body.

The guiders 20a and 20b formed at the vehicle body includes holes (not shown) in the vertical direction through which the second bars 16a and 16b pass, and thus, when lower ends of the second bars 16a and 16b connected to the first bar 12 are moved in the width direction of the vehicle by movement of the first bar 12, the guiders 20a and 20b guide the upper ends of the second bars 16a and 16b to move the upper ends of the second bars 16a and 16b in the vertical direction of the vehicle. However, in a case in which the movement of the first bar in the width direction may be transferred to the movement of the second bars in the vertical direction even though separate guiders are not provided, the guiders may not be formed at the vehicle body.

Meanwhile, according to one embodiment of the present invention, when the first bar 12 is moved in the width direction of the vehicle so that the second bars 16a and 16b are moved in the vertical direction, the upper end of the second bar 16b located in a movement direction of the first bar 12 is moved upward, but the upper end of the second bar 16a opposite the upper end of the second bar 16b may be moved downward.

For example, referring to FIG. 3, when the first bar 12 is moved by a predetermined length L1 in a rightward direction, the upper end of the second bar 16b located at a right side thereof is moved upward by a predetermined height H1. Here, the upper end of the second bar 16a located at a left side thereof is moved downward by the predetermined height H1.

As described above, since the pair of second bars 16a and 16b are formed to move in relatively opposite directions according to the movement of the first bar 12, a relative movement range of the pair of wheel supporters 5a and 5b connected to the left and right wheels 2a and 2b is increased even when a displacement of the movement in the widthwise direction of the first bar 12 is small, a vehicle posture can be better controlled.

Meanwhile, the third bars 19a and 19b may be coupled to the upper ends of the second bars 16a and 16b using second connecting members 18a and 18b. The third bars 19a and 19b extend from outer sides of the upper ends of the second bars 16a and 16b in the lateral direction to be coupled to one sides of the wheel supporters 5a and 5b of the vehicle. Here, the second connecting members 18a and 18b which connect the third bars 19a and 19b to the second bars 16a and 16b may be ball joints or universal joints.

The third bars 19a and 19b are moved in the vertical direction by interworking with movement of the upper ends of the second bars 16a and 16b when the upper ends of the second bars 16a and 16b move in the vertical direction, and one sides of the wheel supporters 5a and 5b coupled to the third bars 19a and 19b may be moved in the vertical direction according to the movement of the third bars 19a and 19b in the vertical direction.

When the second bars 16a and 16b are directly structurally connected to the wheel supporters 5a and 5b, the third bars 19a and 19b and the second connecting members 18a and 18b connected to the second bars 16a and 16b may be omitted.

Meanwhile, according to one embodiment of the present invention, the wheel supporters 5a and 5b coupled to the third bars 19a and 19b may be upper arms 8a and 8b for supporting wheels, lower arms 9a and 9b disposed under the upper arms, or knuckle arms 6a and 6b disposed between the upper arms and the lower arms in the vertical direction.

Here, the third bars 19a and 19b may be coupled to one of one sides of the upper arms 8a and 8b, one sides of the lower arms 9a and 9b, and one sides of the knuckle arms 6a and 6b. Here, an effect on an operation of the actuator for a vehicle may vary according to locations at which the third bars 19a and 19b are coupled.

More specifically, in the first embodiment of the present invention, the third bars 19a and 19b are coupled to one sides of the upper arms 8a and 8b as shown in FIG. 1. As described above, when the third bars 19a and 19b are coupled to the upper arms 8a and 8b, one sides of the upper arms 8a and 8b may be moved in the vertical direction according to an operation of the stabilizer for a vehicle according to one embodiment of the present invention. The movement of one sides of the upper arms 8a and 8b in the vertical direction may have a controlling effect on a camber angle of the vehicle.

Figure 5:
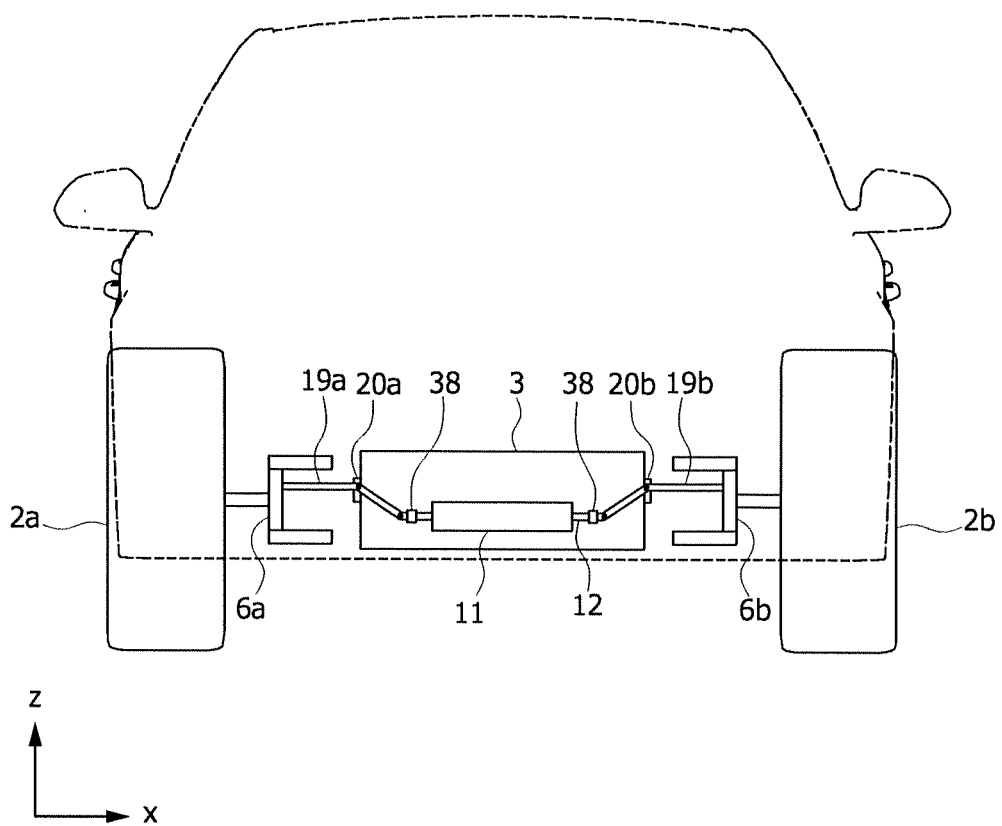
FIG. 5 is a modified example of the stabilizer for a vehicle according to the first embodiment of the present invention and is a front view illustrating a schematic configuration in which third bars are coupled to knuckle arms of a vehicle.

Although the first embodiment of the present invention illustrates an example of a structure in which the third bars 19a and 19b are coupled to one sides of the upper arms 8a and 8b, the third bars 19a and 19b may be coupled to one sides of the knuckle arms 6a and 6b shown in FIG. 5. As described above, when the third bars 19a and 19b are coupled to one sides of the knuckle arms 6a and 6b, angles of the knuckle arms 6a and 6b are adjusted according to the operation of the stabilizer for a vehicle, and thus a toe angle thereof can be controlled.

In addition, although not shown, the third bars 19a and 19b are connected to step links connected to the lower arms 9a and 9b, and thus an inclination or posture of the vehicle body can be controlled.

Meanwhile, in the stabilizer 10 for a vehicle according to the first embodiment of the present invention, a central axis C1 of the hollow motor 34 of the actuator 11 is disposed to be collinear with rotating shafts 4a and 4b of the wheels, and as shown in FIG. 4, the central axis C1 of the hollow motor 34 is disposed to be coplanar with the rotating shafts 4a and 4b of the wheels when the vehicle is seen in forward and backward directions.

As described above, since the central axis C1 of the hollow motor 34 is disposed to be collinear and coplanar with the rotating shafts 4a and 4b of the wheels, when a moving force of the first bar 12 on the central axis of the hollow motor 34 is transferred to a moving force of the second bars 16a and 16b in the vertical direction, the moving force of the first bar 12 is not distributed in the forward and backward directions, and may be transferred to the moving force of the second bars 16a and 16b.

Figure 6:
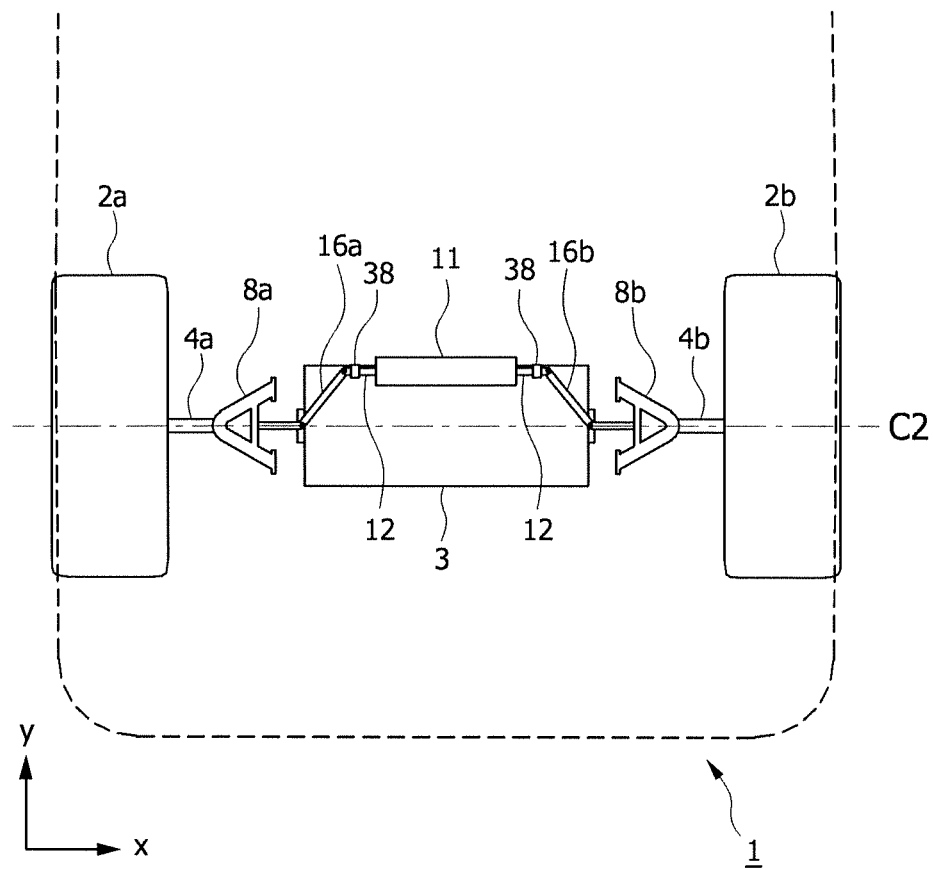
FIG. 6 is another modified example of the stabilizer for a vehicle according to the first embodiment of the present invention and is a plan view illustrating a schematic configuration in which an actuator is disposed in front of rotating shafts of wheels.

Here, although it is preferable that the central axis C1 of the hollow motor 34 is disposed to be coplanar with the rotating shafts 4a and 4b of the wheels in order for a location of the actuator 11 to be as shown in FIG. 4 when the vehicle is seen in the forward and backward directions, in a case in which it is difficult for the central axis C1 of the hollow motor 34 to be coplanar with the rotating shafts 4a and 4b of the wheels when the vehicle is seen in the forward and backward directions due to an internal structure of the vehicle body, the actuator 11 may be formed to be disposed in front of the rotating shafts 4a and 4b of the wheels as shown in FIG. 6.

Although the locations of the upper ends of the second bars 16a and 16b and the third bars 19a and 19b and the operation thereof are formed to be the same as that in the first embodiment, a length of the first bar 12, a coupling state of the first connecting members 14a and 14b which connect the first bar 12 to the second bars 16a and 16b, lengths of the second bars 16a and 16b, and the like may be suitably adjusted to install the first bar 12, the connecting members 14a and 14b, the second bars 16a and 16b, and the like at the vehicle body according to a change of the location of the actuator 11 when necessary.

Figure 7:
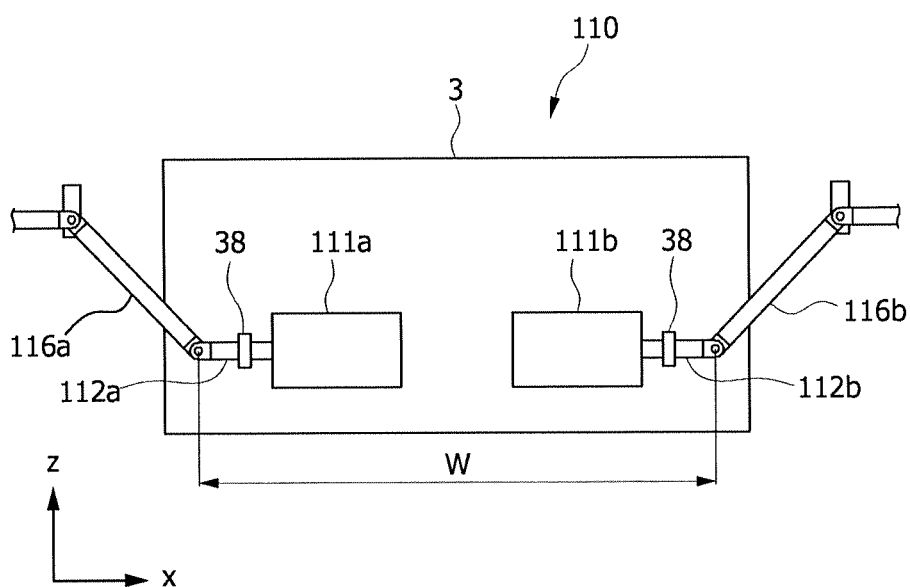
FIG. 7 is a front view illustrating a schematic configuration of a stabilizer for a vehicle according to a second embodiment of the present invention.

FIG. 7 is a front view illustrating a schematic configuration of a stabilizer for a vehicle according to a second embodiment of the present invention.

Referring to FIG. 7, in a stabilizer 110 for a vehicle according to the second embodiment of the present invention, actuators 111a and 111b and first bars 112a and 112b are formed as lateral pairs on the basis of a center of a vehicle in a width direction.

Here, the pair of first bars 112a and 112b, the pair of actuators 111a and 111b, and a pair of second bars 116a and 116b may be disposed to be laterally symmetrical in the width direction of the vehicle.

The stabilizer 110 for a vehicle according to the second embodiment may be formed to be the same structure as that in the first embodiment except for the first bars 112a and 112b and the actuators 111a and 111b. Hereinafter, in order to describe the second embodiment, the same descriptions as the first embodiment will be omitted, and the second embodiment will be described on the basis of a structure distinguished from that of the first embodiment.

According to the second embodiment of the present invention, the first bars 112a and 112b are disposed to extend from outer sides of the actuators 111a and 111b in the width direction of the vehicle.

The actuators 111a and 111b which move the first bars 112a and 112b in the width direction of the vehicle may include a hollow motor which is similar to that in the first embodiment or may include a linear motor other than the hollow motor.

When the actuators 111a and 111b are formed as a pair and the first bars 112a and 112b are respectively coupled to the pair of actuators 111a and 111b as shown in the second embodiment of the present invention, a structure installed inside a vehicle body may be freely formed in comparison to that in the first embodiment because the first bars 112a and 112b do not need to extend over a center of the vehicle.

Here, in the stabilizer 110 for a vehicle according to the second embodiment, a distance between outer ends of the pair of first bars 112a and 112b needs be constantly maintained to be driven like in the first embodiment.

That is, when the outer end of the first bar 112b located at a right side in FIG. 7 is moved rightward, the outer end of the first bar 112a located at a left side in FIG. 7 has to be moved leftward. As described above, a separate controller needs be provided to constantly maintain a distance W between the outer ends of the pair of first bars 112a and 112b.

Since the above structure is formed, the pair of first bars 112a and 112b respectively connected to the pair of actuators 111a and 111b are operated so that one of the pair of second bars 116a and 116b are moved upward and the other thereof is moved downward.

However, since the pair of actuators 111a and 111b are connected to wheel supporters at left and right wheels unlike the first embodiment, the pair of actuators 111a and 111b do not interwork with each other and control the wheel supporters of the left and right wheels, but individually control the left and right wheels or control only one actuator to control the wheel supporters.

Since the second bars and third bars connected to the first bar are moved by movement in the width direction of the first bar, which is moved by the actuator of the stabilizer for a vehicle according to various embodiments of the present invention so that the supporters of the wheels are operated to be moved or worked in a vertical direction, a housing of the actuator is formed not to be twisted, and thus need not be made of a material that is strong enough to have torsional rigidity.

Accordingly, the housing of the actuator, which is used for the stabilizer according to various embodiments of the present invention, may be formed of a material such as aluminum and may be lightweight, the actuator may be formed to be fixed to the vehicle body, and the actuator is prevented from being moved to one side due to the weight thereof, and thereby degradation of an operating efficiency of the stabilizer, such as bending of the first bar connected to the actuator, or the like, can be prevented.

A stabilizer according to one embodiment of the present invention can improve stability of a vehicle body because an actuator moves a stabilizer bar in a width direction of a vehicle and one side of a wheel supporter connected to the stabilizer bar is moved in a vertical direction.

In addition, a stabilizer according to one embodiment of the present invention can be formed so that a housing of a stabilizer actuator is not twisted because a stabilizer bar is moved in a width direction of a vehicle and is not twisted.

In addition, a stabilizer according to one embodiment of the present invention can be made so that a stabilizer bar is not bent because a housing of an actuator is made of aluminum so that the actuator is lightweight.

Further, a stabilizer according to one embodiment of the present invention can be made so that an actuator is prevented from being moved downward by a weight thereof because the actuator is fixed to and supported by a vehicle body.

Furthermore, a stabilizer according to one embodiment of the present invention can variously control an inclination or posture of a vehicle body according to a location of a wheel supporter connected to a stabilizer bar.

As described above, although embodiments of the present invention have been described, the spirit of the present invention is not limited to the embodiments disclosed in the specification. Further, those skilled in the art of the present invention may readily suggest other embodiments by modifying, deleting, or adding components within a scope of the same aspects as those in the present invention, and these embodiments are also within the spirit of the present invention.

The invention claimed is:

1. A stabilizer for a vehicle installed between a pair of wheels of the vehicle, the stabilizer comprising:
   a first bar disposed to extend in a width direction of the vehicle;
   an actuator supported by a vehicle body of the vehicle and coupled to the first bar and a first connecting member to move the first bar in the width direction of the vehicle; and a second bar having one side connected to the first bar and the other side connected to one side of a wheel supporter which supports one wheel of the pair of wheels of the vehicle, wherein, when the first bar is moved in the width direction of the vehicle, the other side of the second bar is moved so that the one side of the wheel supporter is moved in an upper direction or a lower direction of the vehicle.

2. The stabilizer of claim 1, wherein:

the actuator includes a hollow motor; and the first bar is coupled to the hollow motor to be movable through the hollow motor.

3. The stabilizer of claim 2, wherein a central axis of the hollow motor is disposed to be collinear with a rotating shaft of the wheel.

4. The stabilizer of claim 2, wherein:

a pair of second bars, each of which is identical to the second bar, are formed to be disposed at both ends of the first bar;

the pair of second bars are connected to the wheel supporters of the pair of wheels of the vehicle; and when one of the pair of second bars is moved in the upper direction, the other thereof is moved in the lower direction.

5. The stabilizer of claim 4, wherein support members configured to support the first bar are provided at both sides of the actuator of the vehicle body.

6. The stabilizer of claim 1, wherein guiders configured to guide movement in a vertical direction of the other side of the second bar are formed at the vehicle body of the vehicle.

7. The stabilizer of claim 1, wherein a third bar is connected to the other side of the second bar by a second connecting member, and the third bar is coupled to one side of the wheel supporter.

8. The stabilizer of claim 1, wherein the first connecting member includes a ball joint or universal joint.

9. The stabilizer of claim 1, wherein the wheel supporter includes at least one of an upper arm for supporting the wheel, a lower arm disposed under the upper arm, and a knuckle arm coupled between the upper arm and the lower arm.

10. The stabilizer of claim 1, wherein the second bar extends in a vertical direction and is disposed to be oblique in an outside direction of the vehicle from a lower side toward an upper side thereof.

11. The stabilizer of claim 1, wherein:

a pair of first bars, each of which is identical to the first bar, a pair of actuators, each of which is identical to the actuator, and a pair of second bars, each of which is identical to the second bar, are formed; and the pair of first bars, the pair of actuators, and the pair of second bars are disposed to be laterally symmetrical in the width direction of the vehicle.

12. The stabilizer of claim 11, wherein the pair of first bars, which are connected to the pair of actuators, are operated so that one of the pair of second bars is moved in the upper direction and the other thereof is moved in the lower direction.

13. The stabilizer of claim 1, wherein the pair of wheels of the vehicle refers to one or both of front wheels and rear wheels of the vehicle.

14. The stabilizer of claim 1, wherein a housing of the actuator is formed of aluminum.

* * * * *